No. 752,498. PATENTED FEB. 16, 1904.
F. W. WITTE.
BALL JOURNAL BEARING.
APPLICATION FILED JUNE 13, 1903.
NO MODEL.

WITNESSES.  INVENTOR.

No. 752,498. Patented February 16, 1904.

UNITED STATES PATENT OFFICE.

FREDERICK WILLIAM WITTE, OF CHELMSFORD, ENGLAND.

BALL JOURNAL-BEARING.

SPECIFICATION forming part of Letters Patent No. 752,498, dated February 16, 1904.

Application filed June 13, 1903. Serial No. 161,382. (No model.)

*To all whom it may concern:*

Be it known that I, FREDERICK WILLIAM WITTE, a citizen of the United States of America, residing at Chelmsford, in the county of Essex, England, have invented a certain new and Improved Ball Journal-Bearing, of which the following is a specification.

This invention relates to ball-bearings of the two-point type adapted for shafting, axles, and like parts, the object being to provide a journal-bearing of the class having means for taking the lateral end thrust in both directions, of a simple construction, and in which the number of parts is reduced to a minimum.

Figure 1:
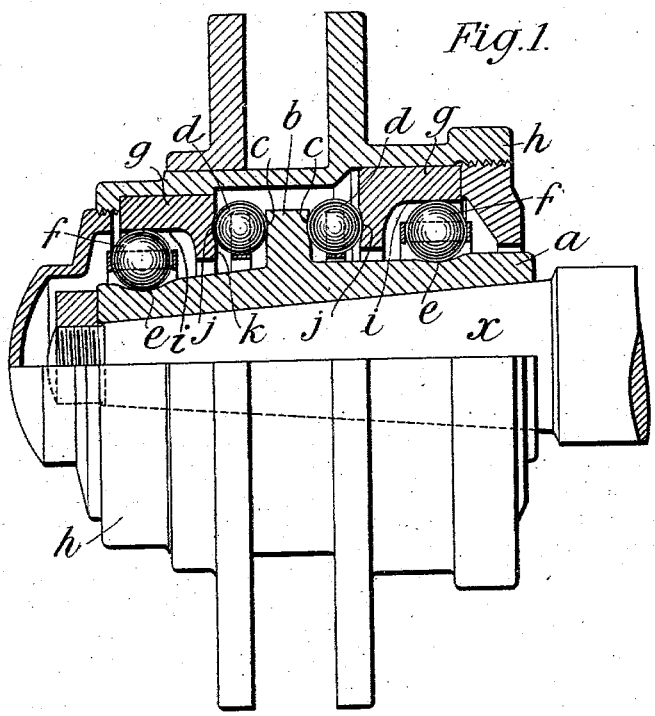
Figure 2:
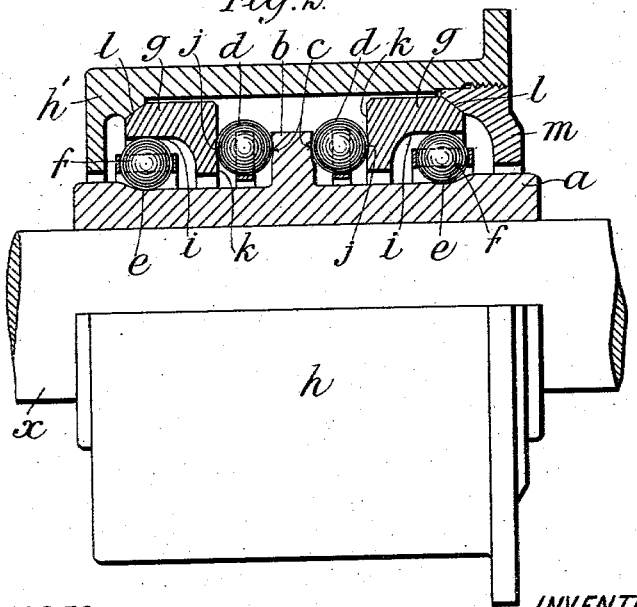

Referring to the accompanying drawings, Figure 1 is a half-sectional elevation of one form the invention may assume, and Fig. 2 is a modification thereof.

In the following description the term "cone" is used to designate that portion of the bearing secured to the shaft or axle and carrying races for the balls and the term "cup" to designate that portion carrying the races, fixed in the casing or hub.

Referring first to Fig. 1, the bearing is composed of a sleeve $a$, forming the cone of a journal secured to an axle $n$ and provided with a more or less central rigid abutment $b$, which may be in one part or not, with the sleeve having on each side thereof races $c$ for the thrust-bearing balls $d$, races $e$ being also provided on the sleeve portion of said cone for the balls $f$, forming the journal-bearing. Each set consists of a row of thrust-balls $d$ and a row of journal-balls $f$, which bear on a common cup-piece $g$, held in a suitable casing $h$, (which may be an axle-box,) the lines of the load for each bearing being substantially at right angles to each other. For this purpose it is preferred to form the cup-piece, as shown, as at a right-angle part (which can be made in one or more pieces) having an elongated plain cylindrical surface running out to the end of the part, forming a race $i$ for the journal-bearings, the race $j$ for the thrust-bearing balls being formed with a groove corresponding to the groove $c$ on the end face $k$ at right angles to the cylindrical portion $i$.

In assembling the parts the cup-piece $g$ is first slipped over the cone as far back as it will go. The journal-balls $f$ are then put in position. The cup is then drawn forward over the balls, (the cylindrical surface permitting this,) and the thrust-balls $d$ are then put in position between the abutment $b$ and the face $k$. This construction enables the combined bearing to be handled in one piece or held in position when the casing or hub is withdrawn.

In some cases it is desirable that a shaft carried by a bearing such as above described may have a slight movement to enable its pressure to be distributed, and in Fig. 2 means are provided for enabling both the double-purpose cup portions $g$ to rock by forming them with seatings or facings $l$, which correspond with similar seatings in the casing $h'$, both of such seating-surfaces being segments of a circle, preferably struck from a center found in the axial line of the shaft, such segmental facings thus forming a rocking seat both for the journal and thrust bearing balls, whereby pressure is enabled to be distributed equally on all the balls and parts both of the thrust and journal bearings.

It is convenient in practice to form one of the segmental seats $l$ as shown in the lock-nut $m$, which retains the parts in the casing.

It will be seen that the construction described provides a very simple form of ball-bearing of the two-point type or, in other words, of the type in which the axes of rotation of the balls are parallel to the axis of the operating part.

What I claim is—

1. In a ball-bearing, the combination with a set of balls for taking the journal-pressure and a further set for taking the thrust, of a cone portion having two separate grooved races, one located vertically, and the other at right angles thereto, a cup portion having two faces at right angles to each other, one of said faces being grooved and the other being a cylindrical surface running out of the part at one end, and of such a length that it can be moved rearwardly before the thrust-bearing balls are put in position, whereby the dimension exposed between the bottom of the groove of the cone and said cylindrical surface is sufficient to allow of the journal-balls being inserted, while when the part is moved forwardly the balls are retained, and the thrust-balls can be placed between the grooved race of the cup and the corresponding grooved race of the cone.

2. In a ball-bearing, the combination with two sets of balls for taking the journal-pressure and a further two sets for taking the thrust, of a cone portion, a rigid abutment forming part of same, having two separate grooved races on each side, one located vertically, and the other at right angles thereto, of cup portions located on each side of said abutment, each cup portion having two faces at right angles to each other, one of said faces being grooved, and the other being a cylindrical surface running out of the part at one end and of such a length that it can be moved rearwardly before its coacting thrust-bearing balls are put in position whereby the dimension exposed between the bottom of the groove of the cone and said cylindrical surface is sufficient to allow of the journal-balls being inserted, while when the part is moved forwardly the balls are retained and the coacting thrust-balls can be placed between the grooved race of the cup and the corresponding grooved race of the abutment.

3. In a ball-bearing, the combination with a cone portion, having two separate races, of a cup portion having two faces at right angles to each other forming races, and having also a bearing-surface forming a segment of a circle, balls located between the races of the cone and cup portions respectively and a retaining-casing having a surface being a segment of a circle and forming a seat for said cup portion.

4. In a ball-bearing, the combination with a cone portion and a rigid abutment forming part of same, of cup portions located on each side of said abutment each cup portion having two faces at right angles to each other forming races, and having also bearing-surfaces forming segments of a circle, balls located between and bearing on each side of said abutment and one face of each cup portion respectively, balls located also on each side of said abutment and between and bearing on the cone and the other races of the cup respectively and a retaining-casing having surfaces being segments of a circle and forming the seats for said cup portions.

In testimony whereof I have hereunto set my hand in the presence of two subscribing witnesses.

FREDERICK WILLIAM WITTE.

Witnesses:
A. KNIGHT CROAD,
ALLEN PARRY JONES.